United States Patent [19]

Watanabe

[11] Patent Number: 4,789,135

[45] Date of Patent: Dec. 6, 1988

[54] OPERATING DEVICE FOR ELECTRIC HOIST

[75] Inventor: Hisatsugu Watanabe, Yamanashi, Japan

[73] Assignee: Kabushiki Kaisha Kito, Kamanashi, Japan

[21] Appl. No.: 90,628

[22] Filed: Aug. 28, 1987

[30] Foreign Application Priority Data

Aug. 29, 1986 [JP] Japan ................................ 61-201581
Aug. 29, 1986 [JP] Japan ........................... 61-132605[U]

[51] Int. Cl.[4] ............................ B66D 1/12; H02P 5/06

[52] U.S. Cl. .................................... 254/362; 200/298; 318/305

[58] Field of Search ................ 254/362, 350; 200/298, 200/1 B, 50 C; 318/301, 305

[56] References Cited

U.S. PATENT DOCUMENTS

| | | | |
|---|---|---|---|
| 3,189,196 | 6/1965 | Carl et al. | 254/362 X |
| 3,493,832 | 2/1970 | Kay | 318/305 X |
| 3,784,165 | 1/1974 | Pruitt | 254/362 X |
| 4,520,247 | 5/1985 | Pancook et al. | 200/298 |
| 4,636,962 | 1/1987 | Broyden et al. | 254/362 X |

FOREIGN PATENT DOCUMENTS

| | | | |
|---|---|---|---|
| 1466692 | 1/1967 | France | 254/362 |
| 18570 | 10/1979 | Japan | 254/362 |

*Primary Examiner*—Stuart S. Levy
*Assistant Examiner*—Joseph J. Hail, III
*Attorney, Agent, or Firm*—Sughrue, Mion, Zinn, Macpeak & Seas

[57] ABSTRACT

An operating device for an electric hoist having a DC motor for raising and lowering an object, comprises a low speed adjusting setting unit (VR1) and a high speed adjusting setting unit (VR2) provided in a control box of the hoist. The operating device further comprises in the control box a two-step push-button switch (PB-U) for the raising operation for switching over the low speed adjusting setting unit and the high speed adjusting setting unit to connect either of the units (VR1 and $VR_2$) to a speed-change control circuit by pushing the two-step push-button switch (PB-U) to either of first and second step positions, and a two-step push-button switch (PB-D) for the lowering operation for switching over the low speed adjusting setting unit (VR1) and the high speed adjusting setting unit (VR2) to connect either of the units to the speed-change control circuit by pushing the two-step push-button switch (PB-D) for the lowering operation to either of first and second step positions.

3 Claims, 10 Drawing Sheets

Normal Rotation

Reverse Rotation

OPERATING DEVICE FOR ELECTRIC HOIST

BACKGROUND OF THE INVENTION

This invention relates to an operating device for an electric hoist whose raising or lowering speed is easily changed from low to high speed and vice versa by two-step push-buttons and the low and high speeds are simply controlled in low and high speed ranges.

The term "hoist" as used herein is intended to designate means having a DC motor for lifting an object, inclusive a chain block.

An operating device for an electric hoist such as an electric chain block has been widely used. With such a hitherto used operating device, a control box is connected to a cable depending from a main body of the electric hoist and is provided with push-button switches for raising and lowering operations and a variable resistor for adjusting raising and lowering speeds.

In raising or lowering an object at an appropriate speed by a hoist having such an operating device, an operator is pressing either of the push-button switches by a finger of his one hand which grips the control box and at the same time he operates the variable resistor by his other hand for adjusting the hoisting speed. Therefore, the operation of the device is very troublesome.

SUMMARY OF THE INVENTION

It is a primary object of the invention to provide an operating device for an electric hoist, which eliminates the above described disadvantage of the prior art and capable of switching over low and high operating speeds and controlling the speeds for raising and lowering operations.

In order to accomplish this object, an operating device for an electric hoist having a DC motor for raising and lowering an object according to the invention comprises a low speed adjusting setting unit and a high speed adjusting setting unit provided in a control box of the hoist, and further comprises in the control box a two-step push-button switch for a raising operation for switching over said low speed adjusting setting unit and said high speed adjusting setting unit to connect either of said units to a speed-change control circuit by pushing said two-step push-button switch to either of first and second step positions, and a two-step push-button switch for a lowering operation for switching over said low speed adjusting setting unit and said high speed adjusting setting unit to connect either of said units to said speed-change control circuit by pushing said two-step push-button switch for a lowering operation to either of first and second step positions.

In order that the invention may be more clearly understood, preferred embodiments will be described, by way of example, with reference to the accompanying drawings.

DESCRIPTION OF THE PREFERRED EMBODIMENTS

Figure 1:
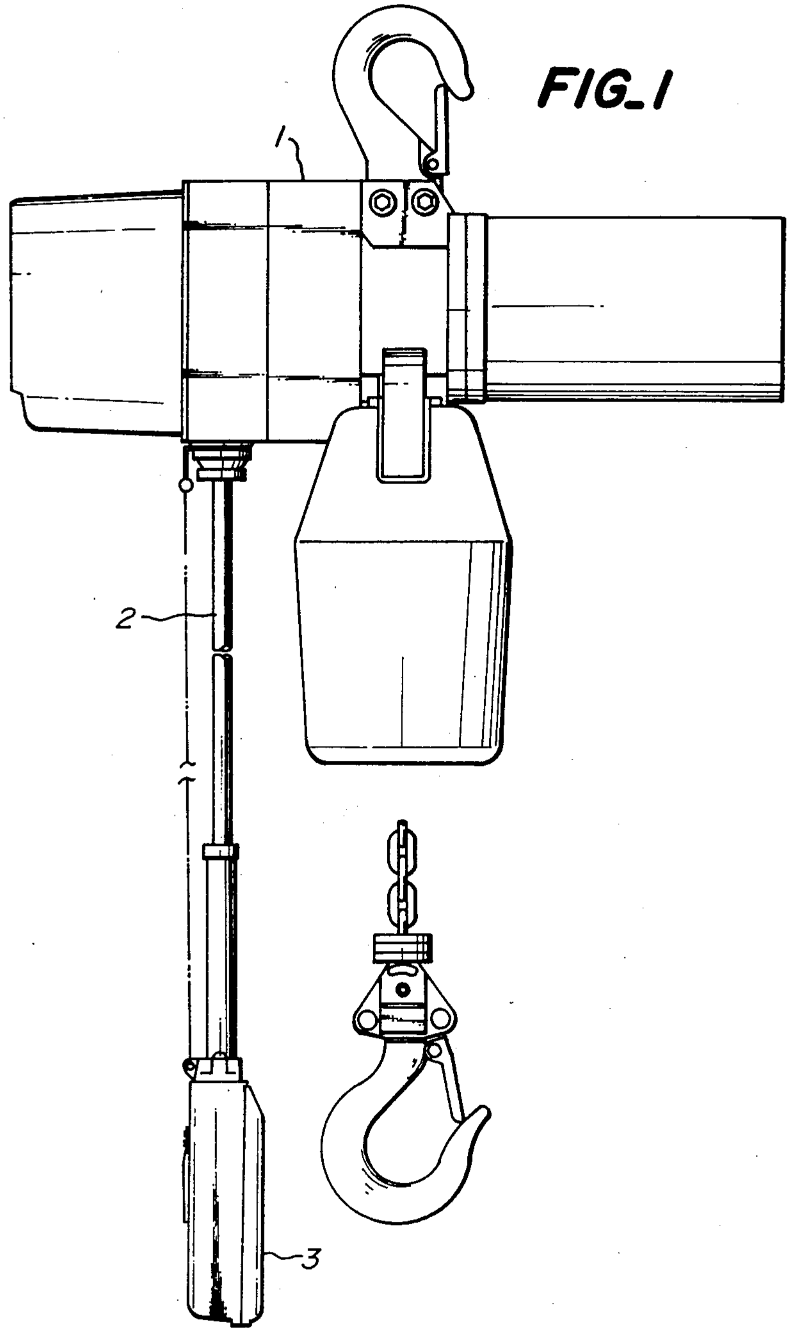
FIG. 1 is a side view of an electric hoist having an operating device according to the invention.
Figure 2:
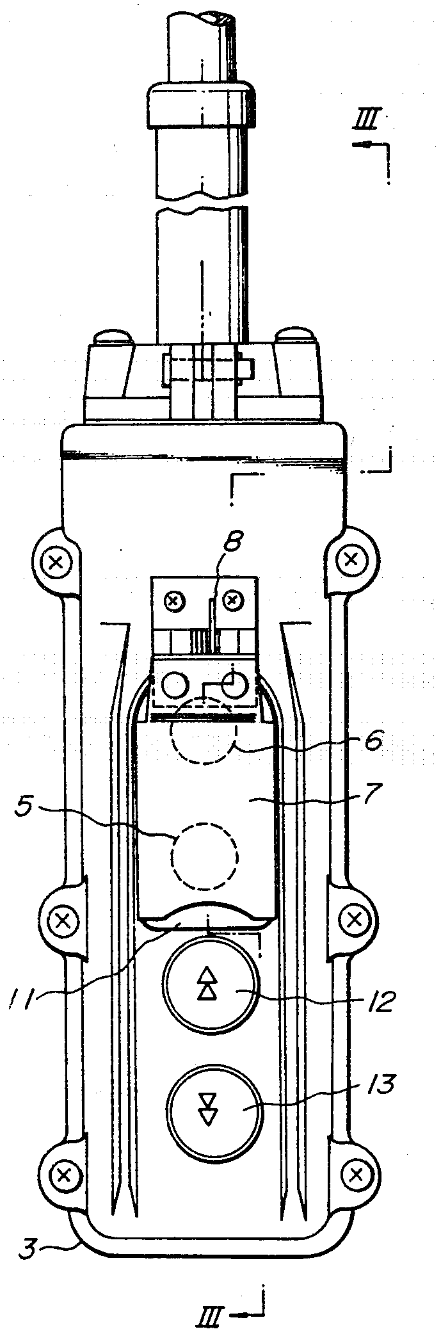
FIG. 2 is a front view of the operating device shown in FIG. 1.
Figure 3:
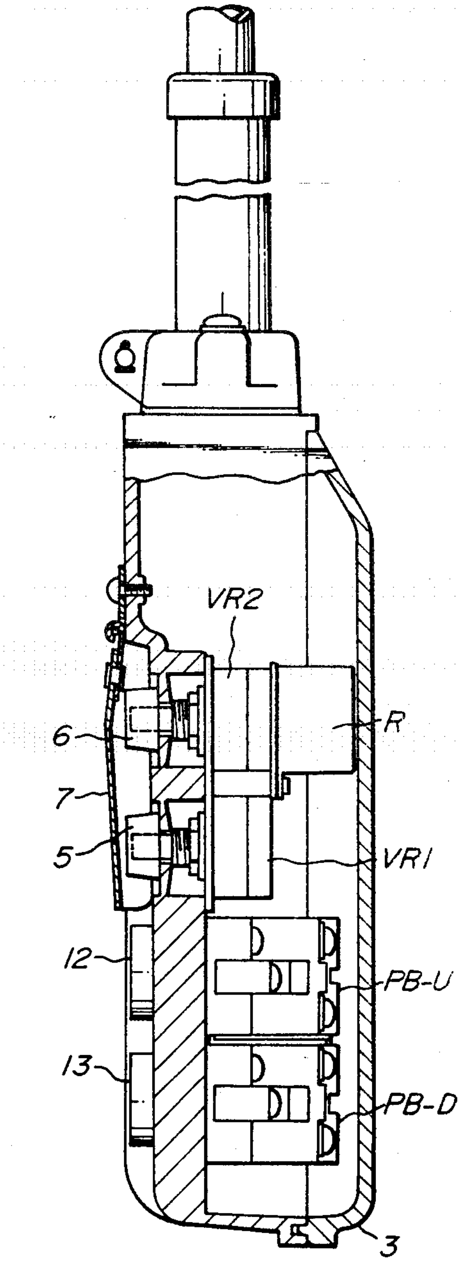
FIG. 3 is a sectional view of the device taken along lines III—III in FIG. 2.
Figure 4:
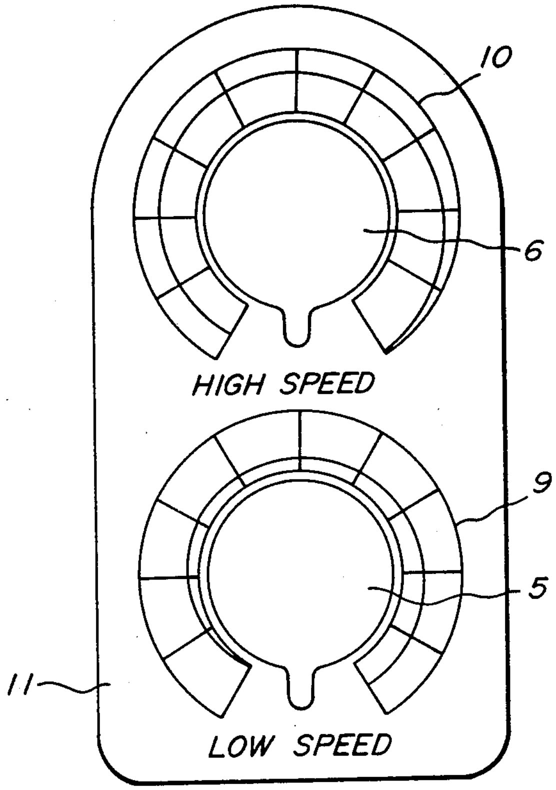
FIG. 4 is a front view of a speed display portion of the operating device shown in FIG. 1.

FIGS. 1–5 illustrate a first embodiment of the invention. An electric hoist comprises a main body 1 and a control box 3 connected to a cable 2 depending form the main body 1. In the control box 3, there are provided a low speed adjusting setting unit VR1 including a variable resistor adapted to be connected to a speed-change control circuit 4, and a high speed adjusting setting unit VR2 including a variable resistor. The control box 3 is provided with a two-step push-button switch PB-U for winding-up operation and a two-step push-button switch PB-D for winding-off operation. When the switch PBU or PBD is actuated by pushing a push-button (later explained) to first step position, the low speed adjusting setting unit VR1 is connected to the speed-change control circuit 4. When the switch PBU or PBD is actuated by pushing the pushing-button to second step position, the high speed adjusting setting unit VR2 is connected to the speed-change control circuit 4. Adjusting knobs 5 and 6 for the low and high speed adjusting setting units VR1 and VR2 are provided on a front surface of the control box 3 for adjusting the raising and lowering speed within low and high speed ranges, respectively. The front surface of the control box 3 is provided at an upper portion with a cover 7 pivotally connected thereat for covering the knobs 5 and 6. The cover 7 is maintained in its closed position covering the knobs 5 and 6 by a spring action of a spring 8 to prevent operation of the knobs 5 and 6 of the units VR1 and VR2 during the operation of the electric hoist.

The front surface of the control box 3 is fixed with indication plates having low and high speed graduations 9 and 10 corresponding to the units VR1 and VR2. On the front surface of the control box 3 are provided push-buttons 12 and 13 for the two-step push-button switches PB-U and PB-D.

Figure 5:
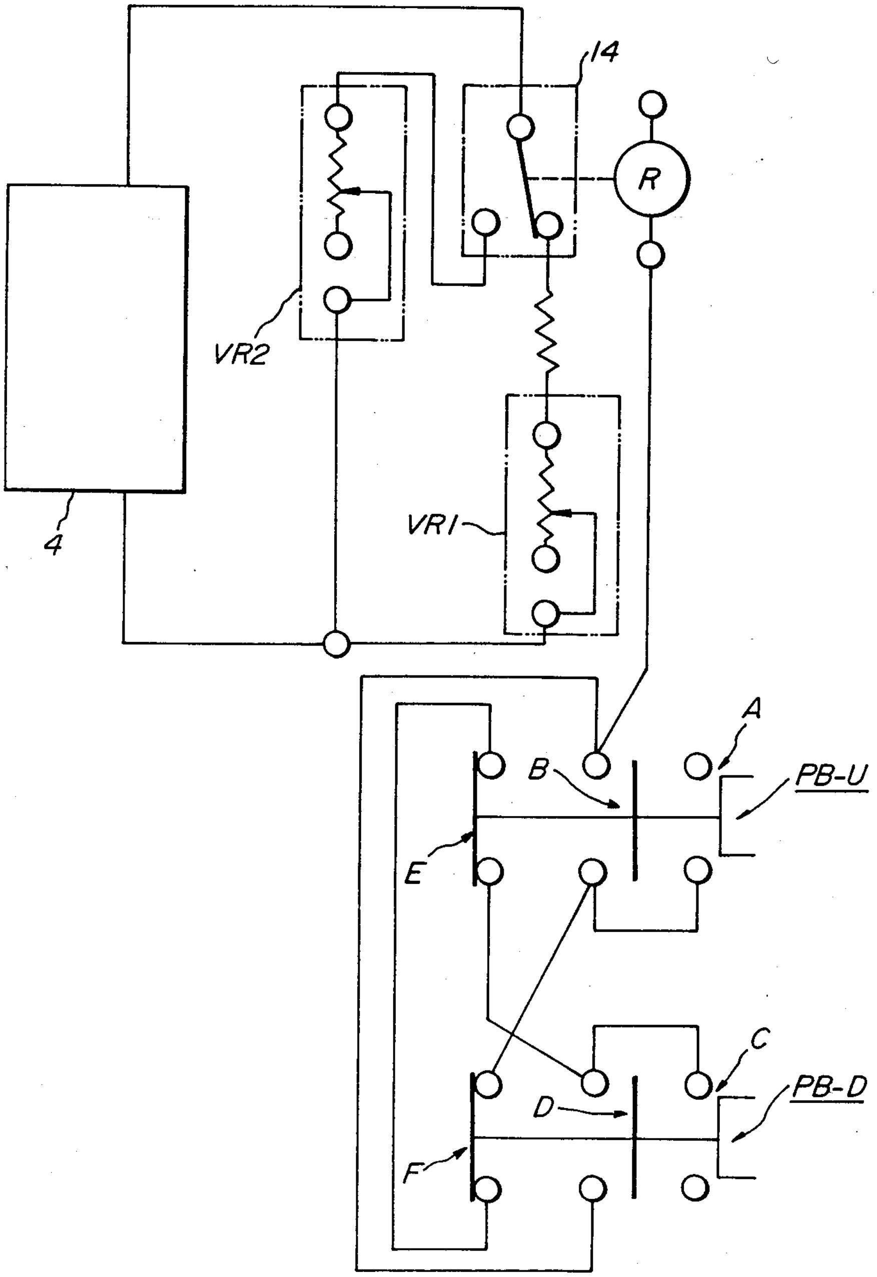
FIG. 5 illustrates an operating circuit for the operating device according to the invention.

FIG. 5 is an operation control circuit for the electric hoist according to the invention. When the push button 12 is pushed to the first step position, a raising contact pair A of the two-step push-button switch PB-U is turned on to start the raising operation of the hoist. Under this condition, as the low speed adjusting setting device VR1 is previously connected to the speed control circuit 4, the raising operation is effected at a predetermined low speed set by the low speed adjusting setting unit VR1.

When the push-button 12 is further pushed to the second step, a high speed contact pair B of the push-button switch PB-U is turned on to excite a relay R so that a switch 14 of the relay R is switched over to connect the high speed adjusting setting unit VR2 to the speed control circuit 4. Therefore, the raising operation is effected at a predetermined high speed set by the high speed adjusting setting unit VR2.

When the push-button switch PB-U is returned to the first step, the raising operation is again effected at the low speed. Upon releasing the pushing force from the switch PB-U, the raising operation is stopped.

When the push-button 13 is pushed to the first step position, a lowering contact pair C of the two-step push-button switch PB-D for lowering operation is turned on to start the lowering operation of the hoist. Under this condition, as the low speed adjusting setting unit VR1 is previously connected to the speed control circuit 4, the lowering operation is effected at the predetermined low speed set by the low speed adjusting setting unit VR1.

When the push-button 13 is further pushed to the second step position, a high speed contact pair D of the push-button switch PB-D is turned on to excite the relay R so that the switch 14 is switched over to connect the high speed adjusting setting unit VR2 to the speed control circuit 4. Accordingly, the lowering operation is effected at a predetermined high speed set by the high speed adjusting setting unit VR2.

When the push-button switch PB-D is returned to the first step position, the lowering operation is again effected at the low speed. Upon releasing the pushing force from the switch PB-D, the lowering operation is stopped.

When the two-step push-button switch PB-U for a raising operation is pushed by the push-button 12, an interlocking contact pair E is turned off. Under this condition, even if the two-step push-button switch PB-D for a lowering operation is pushed by the push-button 13, the a lowering circuit remains inoperative. On the other hand, the two-step push-button switch PB-D for lowering operation is pushed by the push-button 13, an interlocking contact pair F is turned off. Under this condition, even if the two-step push-button switch PB-U is pushed by the push-button 12, the raising circuit remains inoperative.

Figure 6:
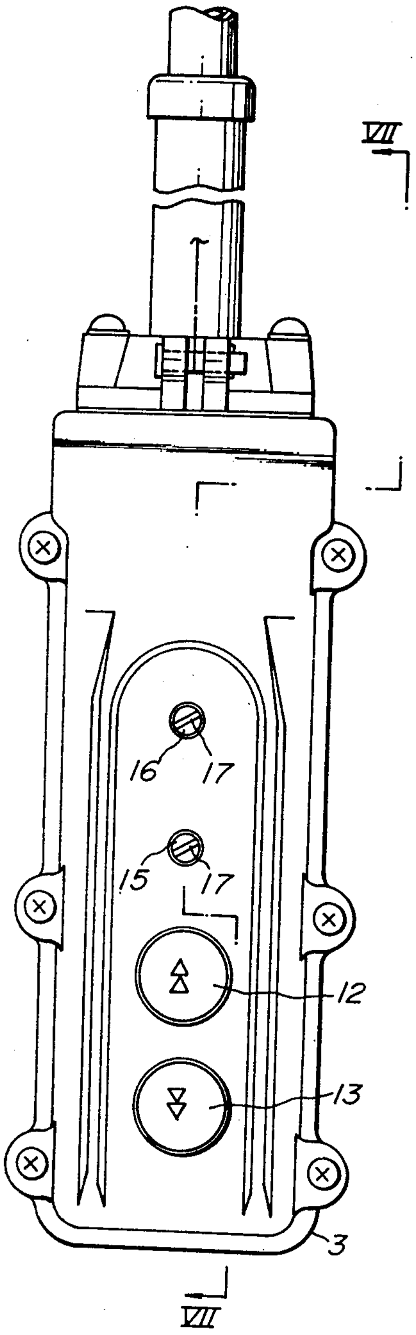
FIG. 6 is a front view of an operating device of another embodiment of the invention.
Figure 7:
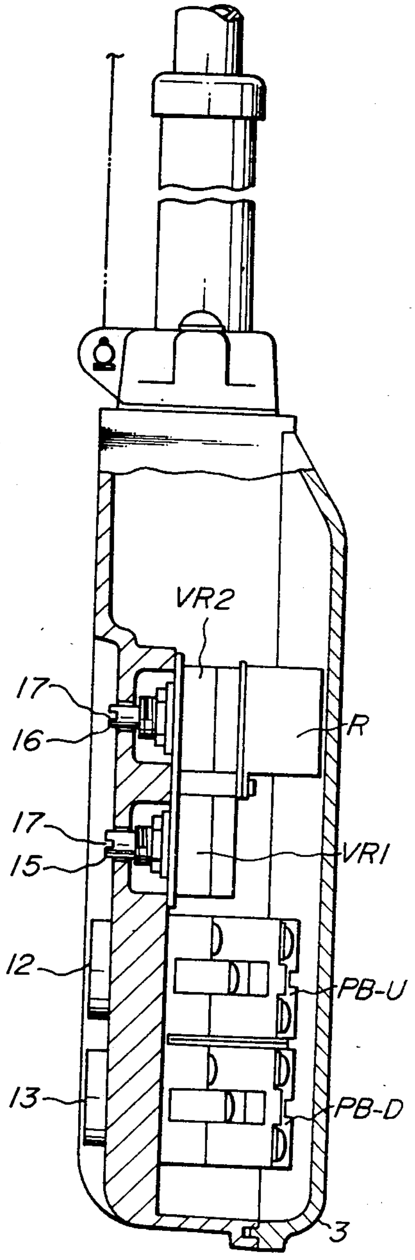
FIG. 7 is a sectional view of the device taken along lines VII—VII in FIG. 6.

FIGS. 6 and 7 illustrate another embodiment of the control device according to the invention. As shown in FIGS. 6 and 7, adjusting shafts 15 and 16 of the low and high speed adjusting setting units VR1 and VR2 may be formed in their extending ends with grooves 17 for engaging a tool such as a screw driver, thereby preventing the adjusting shafts 15 and 16 from being rotated by a hand of an operator. Moreover, the low and high speed adjusting setting units VR1 and VR2 may be enclosed as a whole in the control box 3 so that these units are not adjusted or manipulated by the operator at will.

For constituting the low and high speed adjusting setting units VR1 and VR2, means capable of changing electric signals by mechanically operating means, for example, potentiometer may be used instead of the variable resistor. Moreover, the speed control circuit 4 may be provided in the control box 3.

A preferable control circuit for the operating device according to the invention will be explained in more detail.

Figure 8:
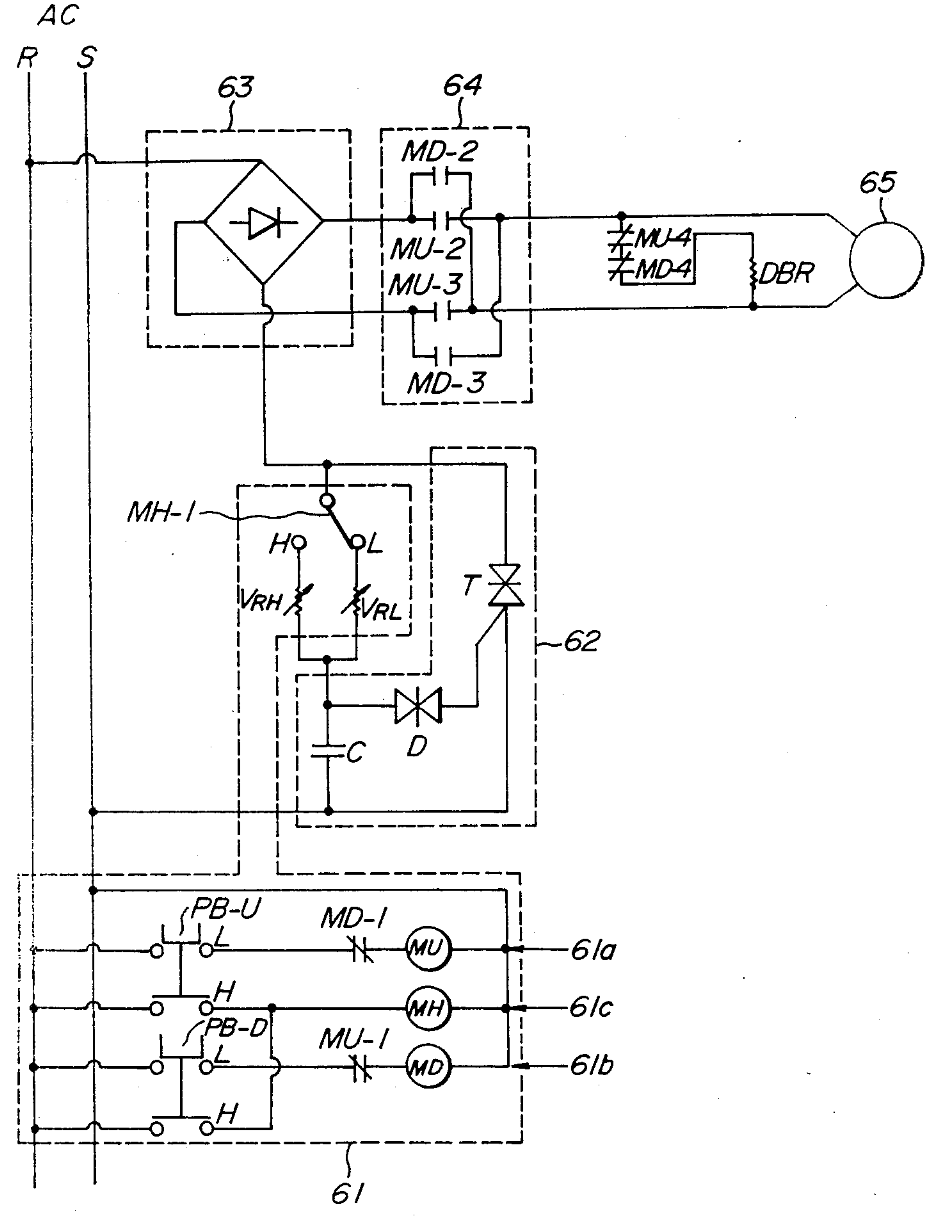
FIG. 8 is a control circuit for the operating device according to the invention.

FIG. 8 illustrates a control circuit for use in the operating device according to the invention, which comprises an operating circuit 61, a phase control circuit 62, a full-wave rectifying circuit 63, a normal and reverse rotating circuit 64, a dynamic brake resistor DBR and a DC motor 65. The operating circuit 61 consists of a raising circuit 61*a*, a lowering circuit 11*b*, high and low speed change circuit 61*c*, and variable resistors VRL and VRH. The raising circuit 61*a* is a series circuit of a low speed contact pair L of a push-button switch PB-U for the raising operation, a normally closed contact pair MD-1 of a relay MD for the lowering operation, and a relay MU for the raising operation. The lowering circuit 61*b* is a series circuit of a low speed contact pair L of a push-button switch PB-D for the lowering operation, a normally closed contact pair MU-1 of a relay MU for the raising operation and a relay MD for the lowering operation. The high and low speed change circuit 61C is a circuit of a high and low speed change relay MH connected in series to a parallel circuit of high speed contract pairs H of push-button switches PB-U and PB-D for raising and lowering operations.

The push-button switches PB-U and PB-D are two-step operable switches. The low speed contact pairs L are closed by pushing the switches to first step positions, while both the low speed contact pairs L and the high speed contact pairs H are closed by pushing the switches to the second step positions. Upon releasing the switches, both the contact pairs L and H are opened.

The variable resistors VRL and VRH are connected in parallel and are switched over by switch-over contacts MH-1 of the high and low speed change relay MH. The variable resistors VRL and VRH serve to control the speeds within low and high speed ranges in a stepless manner, respectively.

The phase control circuit 62 comprises a capacitor C, a two-way trigger diode SBS (trigger element D such as silicon bilateral switch or the like) and a triode AC switch T.

The normal and reverse rotating circuit 14 comprises normally opened contact pairs MU-2 and MU-3 of a relay MU for the raising operation, and normally opened contact pairs MD-2 and MD-3 of a relay MD for the lowering operation. To a dynamic brake resistor DBR are connected in series a normally closed contact pair MU-4 of a relay MU for the raising operation and a normally closed contact pair MD-4 of a relay MD for the lowering operation.

With the control circuit constructed as above described, when the push-button switch PB-U for the raising operation is pushed to the first step position, the lower speed contact L of the switch PB-U is closed to permit alternate current from an alternate current power source AC through the contact L and normally closed contact pair MD-1 to the relay MU for the raising operation. Therefore, the relay MU for the raising operation is actuated to close the normally opened contact pairs MU-2 and MU-3 of the relay MU and to open the normally closed contact pairs MU-1 and MU-4 of the relay MU. As a result, the alternate current from the power source AC is controlled in phase in the phase control circuit 62 and then full-wave rectified in the full-wave rectifying circuit 63. The rectified current is supplied into the DC motor 65 so as to energize it in a normal rotating direction to rotate the load sheave (later described) in a normal rotating direction. At this time, as the high and low speed change relay MH is inoperative and its low speed contact L is closed, the rotating speed of the direct current motor 65 is controlled in stepless manner by adjusting the variable resistor VRL. At this moment, however, as the normally closed contact pair MU-4 of the relay MU for the raising operation is kept opened, any direct current does not flow through the dynamic brake resistor DBR, so that dynamic braking is not effected.

When the push-button switch PB-U for the winding-up operation is pushed to the second step position, both the low and high speed contacts L and H are closed to keep operative the relay MU for the raising operation and the high and low speed change relay MH is actuated to switch over its switch-over contacts MH-1 to the high speed contact H. Under this condition, the rotating speed of the DC motor 65 can be controlled within a high speed range in a stepless manner by adjusting the variable resistor VRH.

When the push-button switch PB-U for the winding-up operation is released, the relay MU for the winding-up operation becomes inoperative to open the normally opened contact pairs MU-2 and MU-3 and close the normally closed contact pairs MU-1 and MU-4 of the relay Mu. As a result, the direct current to the DC motor 65 is interrupted, and the power generated in the DC motor during the rotation of its rotor due to inertia is consumed in the dynamic brake resistor DBR so that the rotation of the rotor is decelerated at a moderate deceleration.

Moreover, if the push-button switch PB-D for the lowering operation is pushed to the first step position, the lower speed contact L of the switch PB-D is closed to permit alternate current from the alternate current power source AC through the contact L and the normally closed contact pair MU-1 to the relay MD for the lowering operation. Therefore, the relay MD for the lowering operation is actuated to close the normally opened contact pairs MD-2 and MD-3 and to open the normally closed contact pairs MD-1 and MD-4. As a result, the alternate current from the power source AC is controlled in phase in the phase control circuit 62 and then full-wave-rectified in the full-wave rectifying circuit 63. The rectified current having a polarity opposite to that in the normal rotation of the DC motor is supplied to the DC motor so as to energize the DC motor in a reverse direction to rotate the load sheave in a reverse rotating direction. At this time, as the high and low speed change relay MH is inoperative and the low speed contact L of the switch-over contacts MH-1 is closed, the rotating speed of the DC motor 65 can be controlled within a low speed range in a stepless manner by adjusting the variable resistor VRL.

At this time, moreover, as the normally closed contact pair MD-4 of the relay MD for the lowering operation is maintained opened, any direct current does not flow through the dynamic brake resistor DBR, so that the dynamic braking is not effected.

When the push-button switch PB-D for the lowering operation is released, the relay DM for the lowering operation becomes inoperative to open the normally opened contact pairs MD-2 and MD-3 and close the normally closed contact pairs MD-1 and MD-4. As a result, the power generated in the DC motor during the rotation of its rotor due to inertia is consumed in the dynamic brake resistor DBR so that the rotation of the rotor is decelerated at a moderate deceleration.

Moreover, when the push-button switch PB-D for the lowering operation is pushed to the second step position, both the low and high speed contacts L and H of the switch PB-D are closed to keep operative the relay MD for the lowering operation and the high and low speed change relay MH is actuated to switch over its switch-over contacts MH-1 to the high speed contact H. Under this condition, the rotating speed of the DC motor 65 can be controlled within a high speed range in a stepless manner by adjusting the variable resistor VRH.

Figures 9A, 9B:
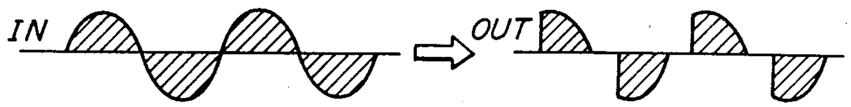
FIG. 9*a* illustrates a waveform of input received in the phase control circuit used in the operating device according to the invention.
FIG. 9*b* shows a waveform of output from the phase control circuit.
Figure 10A:
FIG. 10*a* shows a waveform of input when the DC motor is energized in the normal rotating direction.
Figure 10B:
FIG. 10*b* shows a waveform of input when the DC motor is energized in the reverse rotating direction.
Figure 11A:
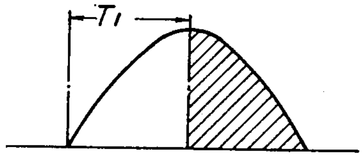
FIGS. 11*a* and 11*b* illustrate waveforms of output from the phase control circuit.
Figure 11B:
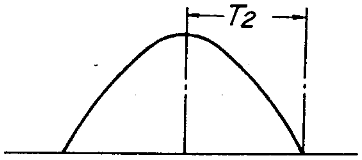

FIGS. 9*a* and 9*b* illustrate input and output waveforms at the phase control circuit 62. The input alternate current IN sinusoidal wave as shown in FIG. 9*a* is controlled in phase in the phase control circuit 62 into the alternate current of the waveform as shown in FIG. 9*b*. The alternate current shown in FIG. 9*b* is full-wave-rectified in the full-wave rectifying circuit 63 into direct current of a waveform shown in FIG. 10*a* or FIG. 10*b*, either of which is supplied to the DC motor 65 according to the raising or lowering operation, that is, the normal or reverse rotation of the DC motor 65.

The power to be supplied to the DC motor 65 is adjusted by adjusting the variable resistors VRH and VRL for setting speeds in the phase control circuit 62. In this case, by suitably selecting ranges of resistance values adjustable by the variable resistors VRH and VRL, the following controlling is possible. For example, when the raising or lowering operation is effected at the high speed range, the variable resistor VRH is operated to control one fourth period $T_1$ which is a first half of a half wave. When the operation is effected at the low speed range, the variable resistor VRL is operated to control one fourth period $T_2$ which is a latter half of the half wave.

A construction of a chain block as one example of an electric hoist controlled by the circuit above described will be explained hereinafter.

Figure 12:
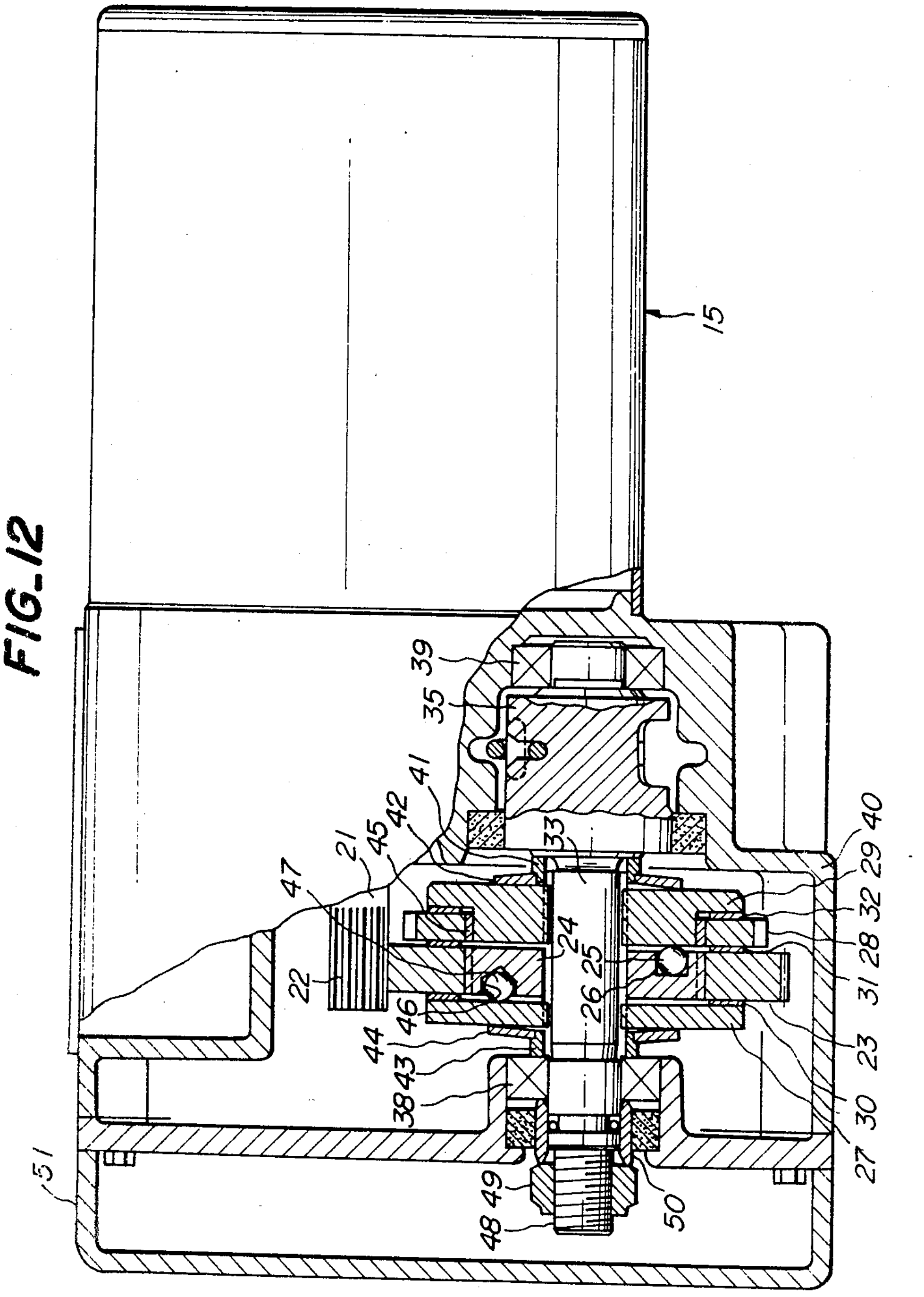
FIG. 12 is a partially sectional side view illustrating a mechanical part of a chain block to which the invention is applied.

FIG. 12 is partial sectional view illustrating the mechanical portion of the stepless variable speed change electric chain block. The mechanical portion of this chain block is substantially similar in construction of that of the Japanese patent application No. 36,500/85 filed by the assignee of this case corresponding to U.S. patent application Ser. No. 832,788.

As shown in FIG. 12, a load sheave shaft 33 integral with a load sheave 35 is journaled by bearing 38 and 39 in the gear box 40 in parallel with a driving shaft 21 formed at one end with a driving gear 22. A support ring 41 is fitted on the load sheave shaft 33 so as to engage one end of the load sheave 35 and is further fitted on a center hole of a support member 42 in the form of a dish-shaped spring made of a spring steel. Moreover, an urging ring 43 made of a steel is fitted on the other end of the load sheave shaft 33 so as to engage the bearing 38 and further fitted in a center hole of an urging member 44 in the form of a dish-shaped spring made of a spring steel.

Figure 13:
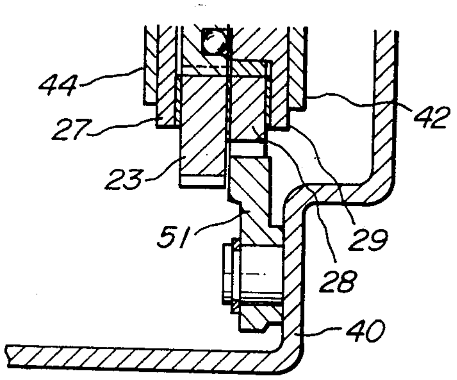
FIG. 13 is a partial sectional view illustrating a pawl to be engaged with a ratchet wheel used in a brake assembly shown in FIG. 12.

A cam support 24 made of a steel is rotatably and axially slidably fitted on a mid-portion of the load sheave shaft 33 between the support member 42 and the urging member 44. A retainer disc 27 made of a steel between the cam support 24 and the urging member 44 is fitted on the load sheave shaft 33 axially slidably but nonrotatably relative thereto. A brake receiving disc 29 between the cam support 24 and the support member 42 is also fitted on the load sheave shaft 33 axially slidably but nonrotatably relative thereto. A ratchet wheel 28 for braking is rotatably fitted on a boss of the brake receiving disc 29 through a sleeve bearing 45. A pawl 51 for braking (FIG. 13) is pivotally mounted on the gear box and is urged into engagement with the ratchet wheel 28 by means of a spring (not shown).

An intermediate driven gear 23 is fitted on an outer circumference of the cam support 24 axially slidably but against rotation relative thereto. Friction plates 30 and 31 are fixed to side surfaces of the driven gear 23, respectively, by means of welding, adhesive or the like. A friction plate 32 between the ratchet wheel 28 and a flange of the brake receiving disc 29 is fixed to a side surface of the ratchet wheel 28 by means of adhesive. The cam support 24 is formed on a side of the brake receiving disc 29 with a plurality of cam grooves 26 in the form of arcs circumferentially spaced apart from each other and concentric to the load sheave shaft 33. Each cam groove 26 has a sloped bottom to change the depth of the groove and receives a brake releasing cam member 25 in the form of a steel ball in this embodiment. Moreover, the cam support 24 is formed on a side of the retainer disc 27 with a plurality of recesses 46 circumferentially spaced apart from each other in a circle concentric to the load sheave shaft 33 for receiving steel balls 47.

An external screw-thread portion 48 provided on the other end of the load sheave shaft 33 extends outwardly from the gear box 40. An adjusting nut 49 is threadedly engaged with the external screw-thread portion 48 of the load sheave shaft 33 out of the gear-box 40 and at the same time engages one end of the collar 50. A tightening force of the adjusting nut 49 urges the central portion of the urging member 44 through the collar 50, the bearing 38 and the urging ring 43 to clamp the retainer disc 27, the intermediate driven gear 23, the ratchet wheel 28, the flange of the brake receiving disc 29 and the friction plates 30, 31 and 32 interposed therebetween with the aid of the support member 42 and the urging member 44.

In this embodiment, a torque limiter is constructed by the urging member 44 and the support member 42 and the intermediate driven gear 23, the retainer disc 27, the brake receiving disc 29, the ratchet wheel 28, and the friction plates 30, 31 and 32 between the members 44 and 42. Moreover, a mechanical brake assembly for preventing load from dropping is formed by the pawl 51 adapted to engage the ratchet wheel 28; the cam support 24 having cam grooves 26; the brake releasing cam members 25; and the ratchet wheel 28 held through the retainer disc 27, the brake receiving disc 29, the intermediate driven gear 23 and the friction plates by the spring forces of the support member 42 and the urging member 44.

In order to adjust the transmission torque of the torque limiter after the electric chain block has been assembled, such an adjustment is performed by simply rotating the adjusting nut 49 out of the gear-box after an electric equipment receiving cover 51 has been removed without requiring disassembling of the electric chain block.

With the above arrangement, when the push-button switch PB-U for the winding-up operation in the operating circuit is pushed to a first or second step portion to energize the DC motor 65 in the normal direction to rotate a driving shaft 21 in a winding-up direction, a driving gear 22 of the driving shaft 21 is driven to cause a cam support 24 to rotate through a driven gear 23. The brake releasing cam member 25 are therefore located at deeper positions in the cam grooves 26, so that the intermediate driven gear 23, the retainer disc 27, the ratchet wheel 28, the brake receiving disc 29 and the friction plates 30, 31 and 32 are clamped by the preset clamping force. Accordingly, the rotation of the intermediate driven gear 23 is transmitted through the retainer disc 27 and the brake receiving disc 29 to the load sheave shaft 33 and the load sheave 35, thereby effecting the raising operation within the torque set by the torque limiter.

When the push-button switch PB-D for the raising operation in the operating circuit is pushed to a first or second step position, the DC motor 65 is energized in the reverse direction to cause the driving shaft 21 to rotate in the lowering direction, so that the cam support 24 is rotated in a reverse direction by the driving gear 22 through the intermediate driven gear 23. Accordingly the brake releasing cam members 25 are moved into shallower positions in the cam grooves 26 to extend higher from the side surface of the cam support 24, so that the cam support 24 and the brake receiving disc 29 move away from each other by the extending action of the brake releasing cam members 25. As a result, the mechanical brake assembly is released so that the load sheave 35 is rotated by a weight of the load faster than the rotating speed driven by the DC motor 65. However, such a rotation of the load sheave 35 results in clamping of the mechanical brake assembly, so that the lowering operation is performed at a speed substantially equal or near to the speed driven by the DC motor 65 by the repetition of the releasing and clamping of the brake assembly.

When the DC motor 65 is deenergized after the load is raised or lowered to a desired height, the transmission mechanism of the block tends to rotate in a reverse direction by the weight of the load. However, such a rotation will clamp the mechanical brake assembly into a unitary body, and after the brake assembly has been clamped, the further rotation will be prevented by the pawl 28 and the ratchet wheel 51.

Although the chain block has been shown, this is only by way of example, and the hoist according to the invention is not limited to this example. In short, the invention is applicable to a hoist inclusive a chain block having a DC motor for driving a shaft for lifting a load.

Figure 14:
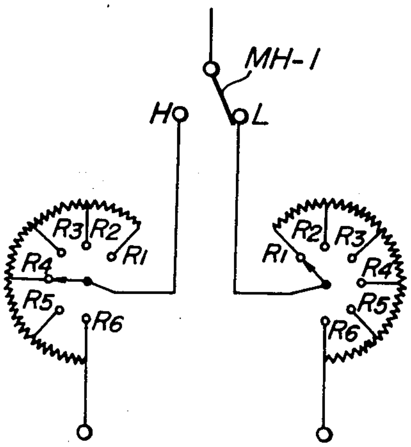
FIGS. 14 and 15 are schematic views of variable resistors to be used in the operating device according to the invention.
Figure 15:
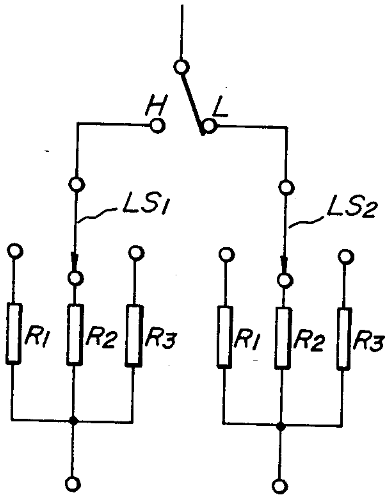

Moreover, the variable resistors VRH and VRL for controlling speeds within high and low speed ranges may be rotary switch type variable resistors as shown in FIG. 14. The speeds are stepwise controlled by the use of taps $R_1$-$R_6$.

Furthermore, instead of the variable resistor VRH and VRL, a plurality of fixed resistors $R_1$-$R_3$ are connected in parallel, and speed control within the high and low speed ranges is effected in plural steps with the aid of rotary switches $LS_1$ and $LS_2$.

According to the invention, the low and high speed adjusting setting units VR1 and VR2 adapted to be connected to the speed-change control circuit 4 are provided in the control box 3 connected to the cable 2 depending from the main body 1 of the electric hoist. In the control box 3, moreover, there are provided the two-step push-button switches PBU and PBD for raising and lowering operations so that the units VR1 and VR2 are switched to be connected to the speed-change control circuit 4 by pushing the push-button switches PBU and PBD to the first and second step positions. Therefore, the electric hoist can be operated for raising operation at predetermined low speeds only by pushing the two-step push-button switch PB-U or PB-D to the first step position for raising or lowering operation. Moreover, the electric hoist can be operated for raising or lowering operation at a predetermined high speed only by pushing the two-step push-button switch PB-U or PB-D to the second step position for winding-up or -off operation. Therefore, raising or lowering operation of the electric hoist can be easily effected at a low or high speed most suitable for the location where the electric hoist is used, by single-handed operation by an operator. Moreover, as the low and high speed adjusting and setting units VR1 and VR2 are arranged in the control box 3 at a low level within operator's reach, the electric hoist can be easily adjusted to be set at low and high speeds optimum for a nature and a configuration of an object to be lifted after the electric hoist in once settled.

Furthermore, according to the invention, the switching over from the high speed operation to the low speed operation and vice versa is effected and the speed control within high and low speed ranges is effected in a stepless manner with the aid of the control circuit. Therefore, the hoist according to the invention is high in responsibility to switching over the operating speeds and has a superior performance in stepless speed control has various advantages as above described.

It is further understood by those skilled in the art that the foregoing description is that of preferred embodiments of the disclosed devices and that various changes and modifications may be made in the invention without departing from the spirit and scope thereof.

What is claimed is:

1. An operating device for an electric hoist comprising; a DC motor for raising and lowering an object, a control box for the hoist having a two-step push-button switch with two pushed positions where the DC motor is energized at low and high speeds, respectively for raising the object; a two-step push-button switch having two pushed positions where the DC motor is energized at low and high speeds, respectively for lowering the object; knobs for changing in a stepless manner speeds of said DC motor for raising and lowering the object; and a cover for covering said knobs for preventing indiscriminate speed change, said electric hoist further comprising a control circuit for controlling the DC motor, said control circuit comprising an operating circuit including raising and lowering relays for the DC motor, respectively, a high and low speed change relay and variable resistors controlled by said knobs and connected in parallel exchangeable with each other by said high and low speed change relay, a phase control circuit for phase-controlling alternate current from a power source, a full-wave rectifying circuit for full-wave rectifying the phase-controlled alternate current and supplying the rectified direct current to the DC motor, and a normal and reverse rotating circuit including normally opened contact pairs of the raising and lowering relays in the operating circuit.

2. An operating device as set forth in claim 1, wherein said phase control circuit comprises a capacitor, a two-way trigger diode and a triode AC switch.

3. An operating device as set forth in claim 1, wherein normally closed contact pairs of said low and high speed operating relays in the operating circuit are connected in series to each other and connected in series to a dynamic brake resistor, and these connected in series are connected in parallel to the DC motor.

* * * * *